United States Patent [19]

Reidenbach

[11] 4,209,736
[45] Jun. 24, 1980

[54] CONDITION RESPONSIVE BATTERY CHARGING CIRCUIT

[75] Inventor: Stanley G. Reidenbach, Ft. Wayne, Ind.

[73] Assignee: General Electric Company, Carmel, Ind.

[21] Appl. No.: 928,705

[22] Filed: Jul. 27, 1978

[51] Int. Cl.² .............................................. H02J 7/10
[52] U.S. Cl. ...................................... 320/22; 320/32; 320/35; 320/37
[58] Field of Search .................................. 320/22-24, 320/31, 32, 35, 36, 37, 38, 39, 40, 43

[56] References Cited

U.S. PATENT DOCUMENTS

| | | | |
|---|---|---|---|
| 3,090,904 | 5/1963 | Jensen | 320/37 X |
| 3,205,425 | 9/1965 | Moyer | 320/39 UX |
| 3,585,482 | 6/1971 | Zelina | 320/39 |
| 3,599,071 | 8/1971 | Lapuyade et al. | 320/22 X |
| 3,848,173 | 11/1974 | Hase | 320/23 |
| 4,052,656 | 10/1977 | Lavell et al. | 320/37 X |
| 4,065,712 | 12/1977 | Godard et al. | 320/35 X |
| 4,125,802 | 11/1978 | Godard | 320/35 |

Primary Examiner—Robert J. Hickey
Attorney, Agent, or Firm—Arthur E. Bahr

[57] ABSTRACT

A battery charging circuit includes a ferroresonant transformer having a rectified output for providing a constant output voltage to be supplied to a battery to be charged. Battery temperature is sensed providing an input to a control circuit which operates a shunt regulator associated with the ferroresonant transformer to provide battery charge voltage as a function of battery temperature. In response to a high battery temperature the controller functions to lower the output voltage to the battery, and in response to a low battery temperature, operates to provide a higher output voltage, with suitable control for any battery temperature between minus 10° and plus 150° Fahrenheit. As the battery approaches full charge and battery acceptance current falls below a predetermined level, a charge cycle termination control allows charging to continue for a period preset by the operator, at the end of which period, line voltage is removed from the charger thereby terminating the charge cycle.

26 Claims, 6 Drawing Figures

CONDITION RESPONSIVE BATTERY CHARGING CIRCUIT

BACKGROUND OF THE INVENTION

This invention relates to battery chargers, and more particularly, to battery charging systems which are automatically controlled as a function of the sensing of certain battery conditions.

The fast charging of storage batteries involves problems relating to battery temperature. Battery charge acceptance characteristics vary depending primarily upon internal battery temperature. Cold batteries, for example, require a higher applied voltage for a given current level than do warm batteries. A constant charging voltage set to charge a cold battery will overcharge a warm battery thereby releasing thermal energy. This results in the battery temperature increasing, worsening the overcharge condition. Such may result in thermal runaway.

Conversely, a constant charging voltage set to avoid overcharging warm batteries is insufficient to charge cold batteries. The result is an undercharge condition. Repeated undercharge or overcharge, or both, yields shortened battery life.

Ideally, the battery charge voltage should be varied as a function, therefore, of battery temperature. However, overcharge or undercharge may also result from an improper duration of charge time at a given charge voltage. There is, therefore, a proper battery charge time requirement which is variable and is related to the length of time needed to bring a discharged battery up to a given set of recharge conditions.

It is, therefore, an object of this invention to provide a battery charging circuit which controls the level of the constant output voltage being supplied to the battery as a function of the temperature of the battery.

It is a further object of this invention to provide a battery charging circuit which incorporates control means for terminating charging a predetermined time after current being supplied to the battery drops below a predetermined level.

These and other objects of the invention will become apparent from the ensuing description of the preferred embodiment.

SUMMARY OF THE INVENTION

In accordance with the present invention, there is provided apparatus, a circuit, for charging a storage battery. Included are input means for connecting the circuit to a source of AC electrical energy and output means for connecting the circuit to a battery to be charged. Means are provided connected to the input means for providing a constant output voltage to the output means for charging the battery. Means are provided for automatically varying the level of the constant output voltage as a function of battery temperature and means are provided for automatically terminating battery charging a predetermined time after current being supplied to the battery drops below a predetermined level.

DESCRIPTION OF THE PREFERRED EMBODIMENT

Figure 1:
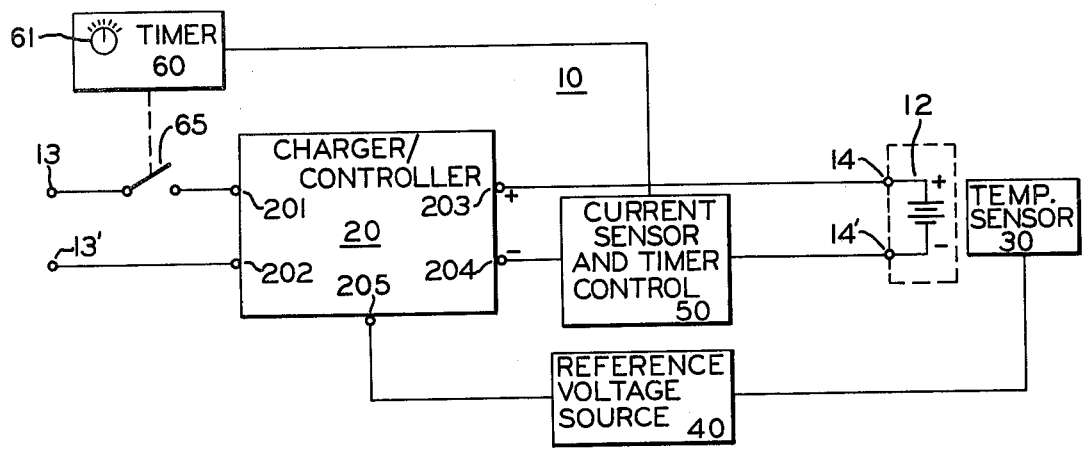
FIG. 1 is a functional block diagram of the preferred embodiment of the battery charging circuit of the present invention.
Figure 2:
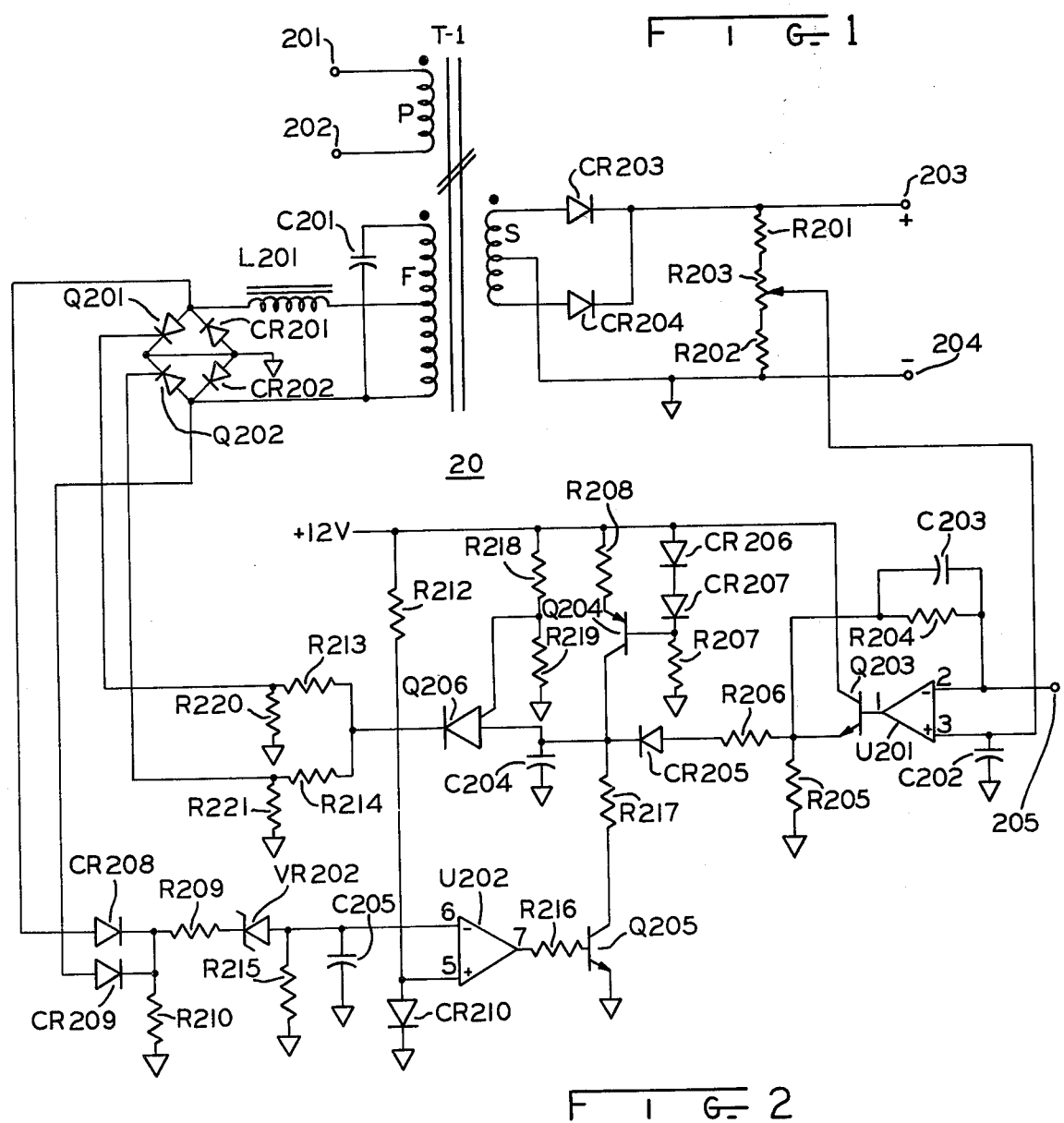
FIG. 2 is a schematic representation of the preferred embodiment of the circuit of the battery charger and temperature responsive control means therefor.
Figure 3:
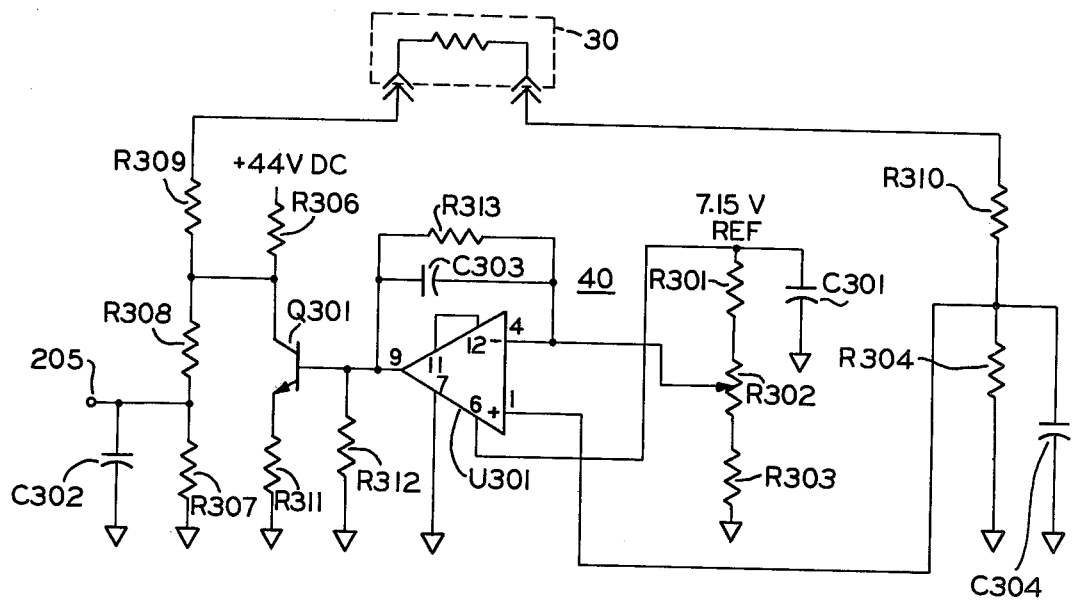
FIG. 3 shows by schematic representation the preferred embodiment of the temperature sensor and temperature variable reference voltage source circuit of FIG. 1.
Figure 4:
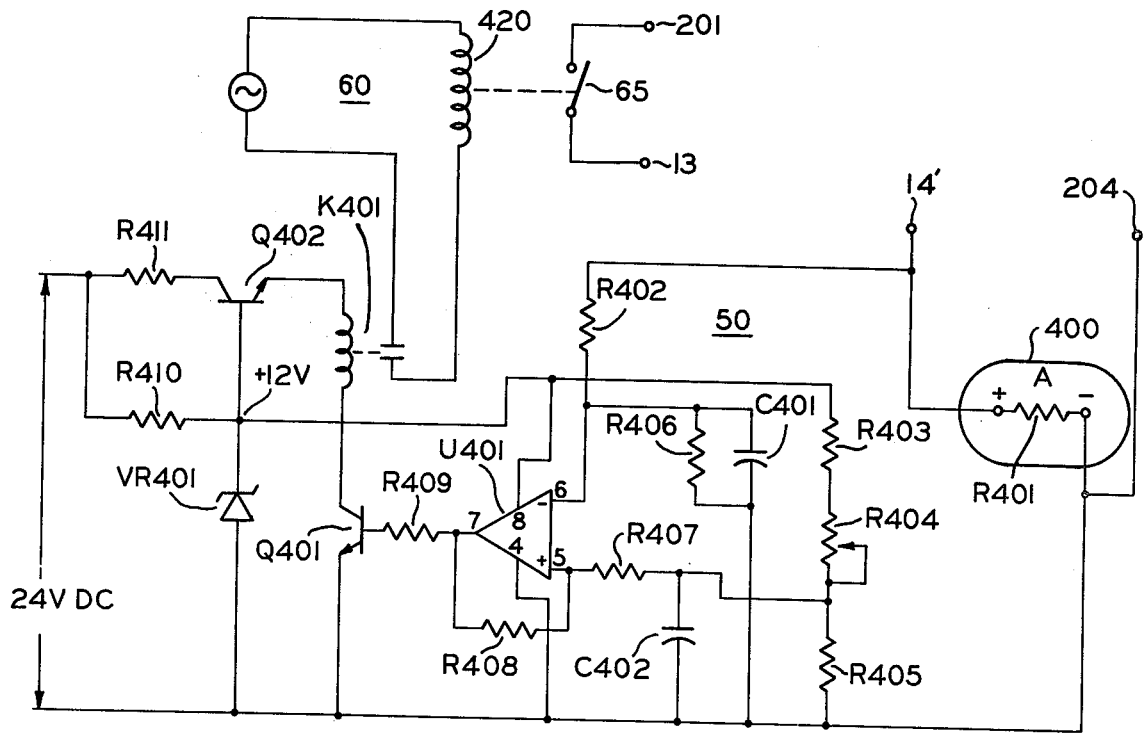
FIG. 4 shows by schematic representation the preferred embodiment of the current sensor and timer control circuit and timer of FIG. 1.

Referring to FIG. 1, there is shown, in function block form, the preferred embodiment of a circuit a arrangement 10 for charging a rechargeable battery such as, for example, lead/acid battery 12. Input means in the form of a pair of input terminals 13 and 13' are provided for connecting circuit 10 to a source of AC electrical energy. Advantageously, this is supplied by a line source of 220 (440) VAC, 60 Hz. Output means are provided in the form of a pair of output terminals 14 and 14' for connecting the output of charging circuit 10 to battery 12. Means are included for providing in the output voltage for charging the battery as are means for automatically varying the level of constant output voltage as a function of battery temperature, these in the form of charger/controller 20, temperature sensor 30, and reference voltage source 40. Details of the charger/controller 20 are shown in FIG. 2; details of the reference voltage source 40 and its affiliation with temperature sensor 30 are shown in FIG. 3; all will be discussed hereinafter. Means are also provided for automatically terminating battery charging a predetermined time after current being supplied to the battery drops below a predetermined level; this takes the form of current sense and timer control 50, and timing means which includes a timer 60, and a timer actuated switch 65. Further details of current sense and timer control 50 and timer 60 are shown in FIG. 4 and will be discussed hereinafter.

Referring to FIG. 2, there is shown, by schematic representation, circuit details of charger/controller 20. In order to provide a constant output voltage for charging a battery, there is provided ferroresonant transformer T1 which includes a primary winding P, a secondary winding S and a ferroresonant winding F along with a ferroresonant capacitor C201. Ferroresonant transformer T1 operates in a manner well known in the art to produce a constant output voltage. Modifying the ferroresonant circuitry is inductor L201 and a control device, an SCR bridge, which includes a pair of SCR's, Q201 and Q202, and a pair of diodes, CR201 and CR202. The anodes of diodes of CR201 and CR202 and the cathodes of SCR's Q201 and Q202 are connected together and to circuit common. This type of connection allows the circuitry to operate and control the AC voltage while monitoring the control circuitry at a common level thus minimizing the sensitivity of the circuitry to transient voltages and stray electrical noise. The circuit common is also connected to one of the terminals of the battery to be charged, as seen in FIG. 2. This SCR bridge-inductor combination is essentially thrown in parrallel with the capacitor C201 to negate the ferroresonance of the circuitry for reducing the output voltage of the ferroresonant transformer. Rectifiers CR203 and CR204 are connected with the output of the secondary of the ferroresonant transformer for producing a rectified constant voltage suitable for charging the battery. The primary of the ferroresonant transformer is connected to input terminals 13 and 13' through a pair of terminals, 201 and 202, and the output of the secondary S of the ferroresonant transformer is provided with a pair of terminals, 203 and 204, for connection to circuit output terminals 14 and 14'.

The SCR bridge is controlled by a comparator and associated control circuitry which will now be described. Means are provided for sensing the rectified output voltage, this in the form of a voltage divider comprising resistors R201 and R202, as well as a variable resistor R203. This voltage divider senses the rectified output voltage of the ferroresonant transformer T1 and provides a feedback signal that is fed to a operational amplifier U201. Amplifier U201 plus capacitor C202 and capacitor C203, transistor Q203, resistors R204, R205, R206 and diode CR205 form an error amplifier and unidirectional circuit to charge capacitor C204. As the circuit output voltage at terminals 14 and 14' approaches a level such that the voltage divider consisting of resistors R201, R202, and R203 produces a signal near the level of the reference voltage input appearing on terminal 205, the circuit turns on and charges capacitor C204 at an increasing rate. Transistor Q204, diodes CR206 and CR207 and resistors R207 and R208 form a constant current circuit that also charges capacitor C204, but at a fixed rate. This type of circuitry has been generically identified in the industry as ramp and pedestal circuitry.

The portion of the circuit consisting of diodes CR208 and CR209, resistors R209 and R210, zener diode VR202, resistor R215, capacitor C205, resistor R212, diode CR210, comparator U202, resistor R216, transistor Q205, and resistor R217 form a regular timed circuit to discharge capacitor C204 near the zero-crossing points of the voltage waveform applied to the SCR bridge. Discharging capacitor C204 at a regular, fixed time relative to the SCR bridge voltage waveform allows the variable charging circuits described above to charge capacitor C204 to a given voltage in a regular, variable, repeatable, timed manner, which will subsequently provided for phase control of the SCR bridge. Resistors R218 and R219, programmable unijunction transistor (PUT) Q206, capacitor C204, resistors R213, R220, R214 and R221 form a comparator-firing circuit for the SCR's, Q201 and Q202. PUT Q206 is an anode-gate fired thyristor which switches from a non-conducting to a conducting state when the anode is approximately 0.3 volts positive with respect to the gate. The anode gate junction of Q206 is in the center of a bridge comparison circuit formed by R218 and R219 on one side and capacitor C204 and its charging circuits on the other side. As the voltage on the capacitor C204 approximates the voltage determined by resistors R218 and R219, the PUT Q206 conducts, forcing current into the SCR gates. The SCR that is forward biased turns on and throws inductor L201 across part of the resonant winding F of the ferroresonant transformer, thus tending to cancel the reactive effect of capacitor C201.

Referring now to FIG. 3 there is shown temperature sensor 30 in the form of a linear temperature sensitive resistor and means for producing a temperature variable reference voltage as a function of the temperature being sensed by sensor 30, the latter in the form of reference voltage source 40. Resistors R301, R302 and R303, capacitor C301 and the voltage on pin 6 of U301 together form an adjustable constant voltage source. Operational amplifier U301 and the remainder of the circuit elements in FIG. 3 form a feedback controlled amplifier which holds the voltage across resistor R304 nearly constant and nearly equal to the constant voltage source. This constant voltage across the fixed resistor results in constant current in temperature sensor 30. As the resistance of temperature sensor 30 changes with temperature, the voltage at the junction of resistor R306 and transistor Q301 adjusts to hold the current in resistor R304 constant. The resistance variation of temperature sensor 30 is then converted to a voltage variation.

Figure 5:
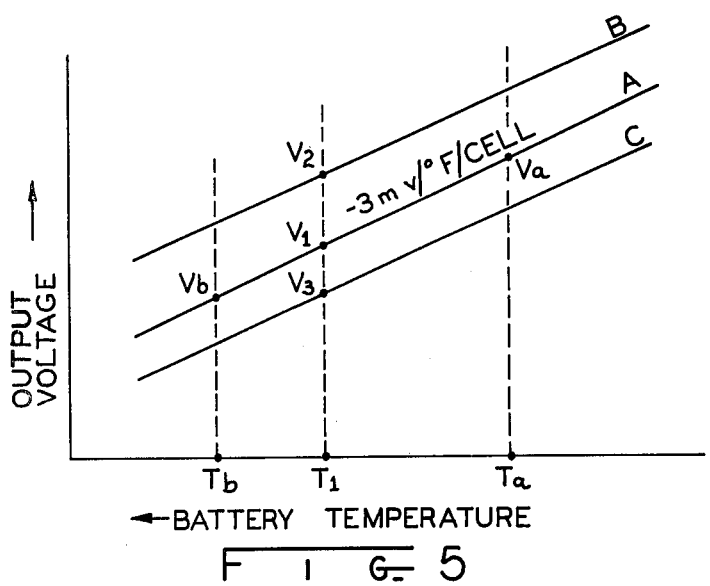
FIG. 5 illustrates graphically the output voltage level adjustment capability designed into the circuitry.

Resistors R307, R308, R309, R310 and R304 are chosen by design to change the resistance variations of temperature sensor 30 to a variable voltage reference at the junction of resistors R307 and R308 that is of the proper level to be compared to a given portion of the output voltage determined by the voltage divider consisting of resistors R201, R202, and R203 in FIG. 2 and with the proper temperature coefficients so as to cause the output of the ferroresonant transformer T1 to be controlled at a temperature variable level that is optimum for charging the battery. The constant output voltage is therefore regulated to be a predetermined multiple of the temperature variable reference voltage. The specific circuit element values chosen were designed to provide a temperature variation (slope) of minus 0.003 volts per cell per degree Fahrenheit, as illustrated in FIG. 5. Adjusting resistor R302 varies the set value of the constant current in resistor R304 and subsequently the set value of the temperature variable voltage reference. This in turn changes the output voltage of the ferroresonant transformer at a given temperature. Referring to FIG. 5, and assuming a temperature of T1, resistor R302 can be adjusted to set the output voltage: at point V1 to provide an output characteristic curve A suitable for a given battery; at point V2 to provide increased set point voltage and an output characteristic curve B for a battery for which a higher charge voltage is desired; and at point V3 to provide a decreased set point voltage and overall lower curve C if desired. Of course, as many different settings are available as are adjustments of resistor R302. Variable resistor R302, therefore, serves as a means for manually adjusting the level of the constant output voltage in terminals 14 and 14' for a given battery temperature. This can likewise be achieved by adjusting resistor R203 of the voltage divider in FIG. 2. The output of the reference voltage source 40 is supplied to terminal 205 of the charger/controller 20. Changing the values of resistors R307, R308, R309, R310 and R304 and/or the temperature characteristic of temperature sensor 30 will allow a different slope of the resultant temperature characteristic of curves A, B and C.

Referring now to FIG. 4 there is shown a detailed schematic representation of the termination control means, current sense and timer control 50 and timer 60. An ammeter shunt resistance R401 is used as a current sense resistor to sense the level of the current being supplied to the battery: the acceptance current. Resistor R401 is connected to terminal 204 of the charger/controller 20 and to circuit output terminal 14', the negative output terminal to the battery. The circuit elements of timer control 50 form a semiconductor switch that conducts when the voltage across the current shunt, resistor R401, falls below a predetermined or preset, reference level. Resistor R410 and zener diode V401 form a 12 volt reference that is divided down to approximately 14 millivolts by resistors R403, R404 and R405 and filtered by capacitor C402. Resistor R401 is the ammeter shunt resistance across which 14 millivolts is generated at a current of 10 amperes, the value selected as the set current level for the beginning of the timed end of charge interval. Resistors R402 and R406 and capacitor C401 form an averaging filter to smooth the signal to the input of the operational amplifier U401. R407 serves to match the impedances to the inputs of U401. R408 is a positive feedback resistor which helps provide a snap action of and hysteresis in the change in output state of the array consisting of U401, R409 and Q401 as the voltage across resistor R401 goes from more than 14 millivolts to less than 14 millivolts. In the embodiment shown, the adjustment in reference voltage provided by resistor R404 allowed a change in the set point of the switching level of from approximately 6 millivolts to 18 millivolts. R410, R411, VR401 and Q402 form a 12 volt source to operate the reed switch K401. When the voltage across resistor R401 exceeds the reference voltage, the reed switch contacts are open. When the voltage across resistor R401 falls below the reference voltage, the reed switch contacts close and actuate the timer motor for the timed end of charge interval.

Timer 60 is of the type well known in the art and includes a timer motor 420 adapted for connection to an AC source, and cam-actuated switch 65. Switch 65 is connected serially between input terminal 13 and charger/controller 20 (FIG. 1). Timer 60 is of the manually-settable type which is adjusted by the operator at the initiation of the charge cycle. To start the cycle, the operator rotates the rotatable, time-set knob 61 a small amount. This closes switch 65 to energize the battery charge circuit. The operator then further rotates the knob to choose the period of time during which he wishes the charger to operate after acceptance current being supplied to the battery drops below the predetermined level. This time may vary from nearly zero up to the maximum allowed by a particular timer. Upon the acceptance current dropping below the predetermined level $I_T$ shown in FIG. 6, timer control 50 causes relay K401 to be energized thereby to close the switch thereof, this allowing the timer motor 420 to become energized. The timer motor then runs for the preset period of time, upon which the cam (not shown) actuated by the timer motor opens switch 65 to deenergize the charging circuit.

Referring generally to all the drawing figures, a brief summary of the operation of the battery charging circuit 10 will now be presented. Assuming that the circuit is connected to a line source of AC electrical energy and the manual control, resistor R302, is set to provide a circuit output characteristic as shown at curve A in FIG. 5, when it is desired that a battery, such as lead acid rechargeable battery 12, be recharged, the operator first connects the output terminals of the charging circuit 10 to the appropriate terminals of the battery. He then rotates knob 61 on the timer 60 to close switch 65 thereby applying line voltage to the charger/controller 20. He then further rotates the knob on the timer to choose the period of rundown time for the end of the charging cycle. The charger/controller 20 then supplies a constant output voltage to the battery for a given battery temperature. The temperature sensor 30, which is in thermal contact with the battery, operates to sense the temperature thereof and provides a signal to the reference voltage source 40. The signal is processed in the circuitry of reference voltage source 40 to produce a temperature variable reference voltage which is supplied to terminal 205 of charger/controller 20 and in particular to the negative terminal of amplifier U201 of the controller shown in FIG. 2. At the same time, the voltage divider comprising resistors R201, R202 and R203 senses the output voltage of the charger circuit and provides a feedback signal which is fed to the positive terminal of the amplifier U201. Amplifier U201 then compares the feedback voltage from the divider to the temperature variable reference voltage. The circuitry then responds to the battery temperature in such a way that it modifies the output voltage of the ferroresonant transformer T1 so that it is suitable for charging the battery. In other words, as shown in FIG. 5, if the sensed temperature of the battery is relatively low as at Ta, the circuit allows for a higher constant output voltage Va to be supplied for charging the battery. As the temperature of the battery rises to Tb, the circuit operates to control the ferroresonant transformer to lower the level of the constant output voltage being supplied to the battery to Vb. This comparing process continues throughout the charging cycle to provide any output voltage on curve A corresponding to a particular battery temperature. The charging cycle then continues until the current being supplied to the battery by the charger, as sensed by current sense and timer control 50, and more precisely by sensing resistor R401, drops below a predetermined level (for example $I_T$ in FIG. 6). When this battery acceptance current drops below that particular level, timer control circuit 50 operates to activate relay K401 to close the circuit for allowing the timing motor 420 to begin operating. The timer motor then operates for a period of time as preset by the operator, and at the end of that period of time, a cam associated with the timer motor as part of the timer 60 causes switch 65 to open thereby removing line voltage from the circuit and thus ending the battery charge cycle.

Figure 6:
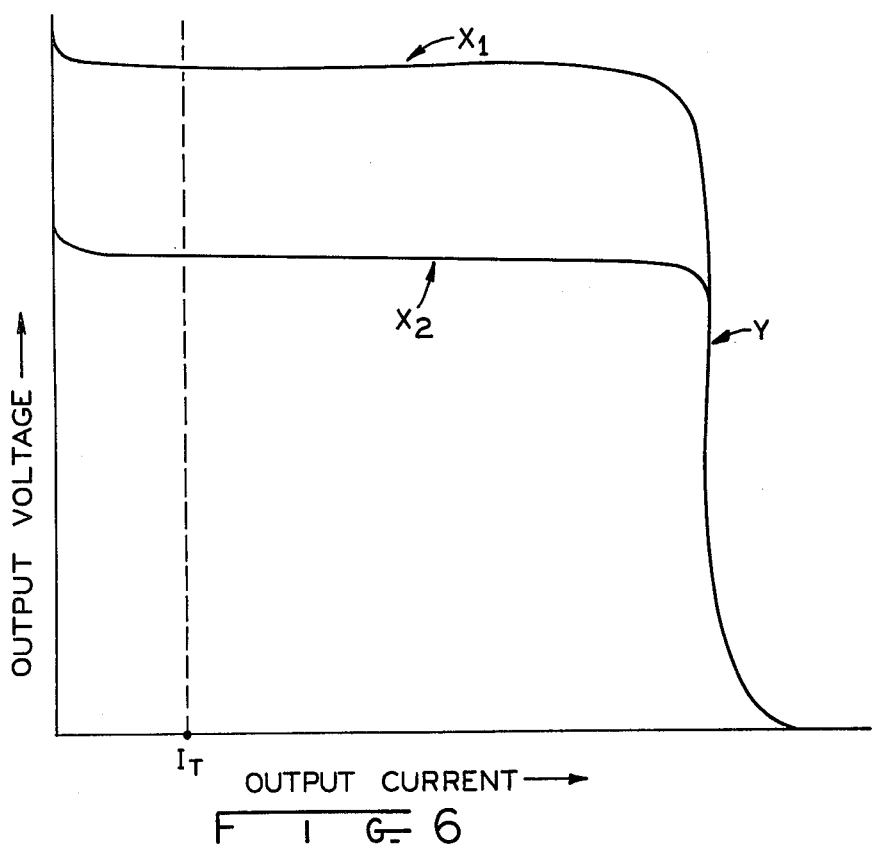
FIG. 6 shows, graphically, the output characteristic of the preferred embodiment of the battery charging circuit.

FIG. 6 shows a graphical representation of the battery charger operation. The portion of the curve X1 represents the constant output voltage produced to charge a cold battery (a given temperature). The portion of the curve X2 represents the constant output voltage produced to charge a somewhat warmer battery (another given temperature). The portion of the curve Y represents charging current limiting provided inherently by the ferroresonant transformer. Point $I_T$ represents the battery acceptance current set point below which level the timed end of charge interval occurs.

The battery charging circuit shown in the drawing figures has been constructed and has operated satisfactorily with components having the following values:

| Battery | 12 | 120V (20-6V golf cart batteries in series) |
|---|---|---|
| In FIG. 2: | | |
| Transformer | T-1 | Primary winding P: 81/81 turns, .0641" dia. wire |
| | | Secondary winding S: 84 turns, .108" dia. wire, center-tapped |
| | | Ferroresonant winding F: 166 turns, center tapped, .0641" dia. wire |
| Capacitor | C201 | 10 micro F, 660 VAC |
| Inductor | L201 | 44 millihenry |

-continued

| | | |
|---|---|---|
| Diodes | CR203, CR204 | IN 3495, 400 V, 25 A |
| | CR201, CR202 | Motorola MR328, 600V, 25A |
| Diodes | CR205, CR206 | IN 458 |
| | CR207, CR210 | |
| | CR208, CR209 | IN4004 |
| SCR's | Q201, Q202 | C37M |
| Transistors | Q203 | 2N3392 |
| | Q204 | 2N4248 |
| | Q205 | 2N3414 |
| PUT | Q206 | 2N6027 |
| Capacitors | C202 | .01 micro F, 1KV |
| | C204 | .33 micro F, 100V |
| | C205 | .1 micro F, 100V |
| Zener Diode | VR202 | IN5242B, 12V, 5%, ½ W. |
| Resistors | R201 | (2) 68 Kohm, 2%, in series |
| | R202 | 2.7 Kohm, 2% |
| | R203 | 1 Kohm, vrbl. |
| | R204 | 68 Kohm, 2% |
| | R205, R212 | 22 Kohm |
| | R207, R219 | 22 Kohm |
| | R206 | 1 Kohm |
| | R208 | 3.6 Kohm |
| | R209 | 25 Kohm, 10 W. |
| | R210 | (3) 3.5 Kohm 10 W. |
| | R213, R214 | 22 ohms |
| | R215 | 470 ohm |
| | R216 | 10 Kohm |
| | R217 | 68 ohm |
| | R218 | 11 Kohm |
| | R220 | 1 Kohm |
| | R221 | 1 Kohm |
| Operational Amplifier | U201 | ½ LM 358N - National Semiconductor |
| | U202 | ½ LM 358N - National Semiconductor |
| In FIG. 3: | | |
| Capacitors | C301 | 2 micro F, 50V |
| | C302 | .1 micro F, 100V |
| | C303 | .01 micro F, 1KV |
| | C304 | .01 micro F, 1KV |
| Resistors | R301 | 3.9 Kohms, ½ W. 2% |
| | R302 | 1 Kohm, ½ W., 10%, vrbl. |
| | R303 | 3 Kohm, ½ W., 2% |
| | R304 | 3.9 Kohm, 2% |
| | R306 | 3.9 Kohm |
| | R307 | 4.7 Kohm, 2% |
| | R308 | 39 Kohm, 2% |
| | R309 | 12 Kohm, 2% |
| | R310 | 3.3 Kohm, 2% |
| | R311 | 2 Kohm |
| | R312 | 10 Kohm |
| | R313 | 68 Kohm, 2% |
| Transistor | Q301 | 2N3859A |
| Operational Amplifier | U301 | LM723CN, National Semiconductor |
| Temperature Sensor | 30 | 14.5 Kohms @25° C., −100 ohms/°C. (Keystone Carbon Co. "Linistor", model 101) |
| In FIG. 4 | | |
| Capacitor | C401 | 10 micro F, 20V |
| | C402 | 10 micro F, 20V |
| Resistors | R401 | approx. 1.4 milliohm |
| | R402, R403 | 10 Kohms |
| | R407, R409 | 10 Kohms |
| | R404 | 10 Kohm, vrbl. |
| | R405 | 18 ohms |
| | R406 | 100 Kohms |
| | R408 | 22 M ohm |
| | R410 | 1.5 Kohm, 2W |
| | R411 | 150 ohm, 2W |
| Transistors | Q401 | 2N3392 |
| | Q402 | 60408-RCA |
| Zener Diode | VR401 | IN5242B |
| Operational Amplifier | U401 | ½ LM 358M - National Semiconductor |
| Relay | K401 | 12V reed relay, 120V contacts, (Douglas Randall 377248) |
| Timer | 60 | Robertshaw 701 |

It should be apparent to those skilled in the art that the embodiment described heretofore is considered to be the presently preferred form of the invention. The specific circuit is intended as exemplary and not limitative of the invention. For example, the means for automatically varying the level of constant output voltage, that is, the means for regulating the ferroresonant transformer, may be accomplished with any shunt type of regulation on the low side of a high reactance transformer. Inductor L201 is intended to provide an essentially lossless way of affecting the output. Certainly the SCR bridge could be replaced by a rectifier bridge in series with an SCR, or by a triac device. And certainly output voltage sensing may be accomplished in a variety of ways including AC as well as DC means. Other ideas come to mind also as a means of effecting termination of the charge cycle as a function of state of charge of the battery. The appended claims are therefore intended to include such modifications and others which may occur to those skilled in the art as coming within the true spirit and scope of the invention. What is claimed is:

1. Apparatus for charging a storage battery, comprising:
   input means for connection to a source of AC electrical energy;
   means connected to the input means for providing a constant output voltage for charging the battery;
   output means for connecting the constant output voltage providing means to the battery to be charged;
   means for automatically varying the level of the constant output voltage as a function of battery temperature; and
   means for automatically terminating battery charging a predetermined time after current being supplied to the battery drops below a predetermined level.

2. The apparatus of claim 1 further comprising:
   means for manually adjusting the level of the constant output voltage for a given battery temperature.

3. The apparatus of claim 1 wherein the constant output voltage providing means includes a constant voltage transformer and means for rectifying the output thereof.

4. The apparatus of claim 3 wherein the means for automatically varying includes:
   means for sensing battery temperature;
   means for producing a temperature variable reference voltage as a function of the temperature sensed by the temperature sensing means; and
   means for sensing the rectified output voltage being supplied at the output means.

5. The apparatus of claim 4 wherein the means for automatically varying further includes a shunt regulator operatively associated with the constant voltage transformer.

6. The apparatus of claim 5 wherein:
   The constant voltage transformer is a ferroresonant transformer having a tapped ferroresonant winding, the distal ends of which are interconnected through a capacitor;
   the shunt regulator including as SCR bridge of the type having a pair of SCR's whose cathodes are interconnected and a pair of diodes whose anodes are interconnected, the two interconnections being connected together and to circuit common, the interconnections of the diode and SCR pairs being connected, respectively, to the tap of the ferroresonant winding through current limiting means and to one of the distal ends of the ferroresonant winding.

7. The apparatus of claim 5 wherein the means for automatically varying further includes means for controlling operation of the shunt regulator, the means for controlling including comparator means for comparing the temperature variable reference voltage with a portion of sensed output voltage being supplied to the battery by the constant voltage transformer, the means for controlling acting to control the shunt regulator for adjusting the level of the constant output voltage to be a predetermined multiple of the temperature variable reference voltage.

8. The apparatus of claim 7 further including means for manually adjusting the level of the temperature variable reference voltage thereby to change the level of the constant output voltage for a given battery temperature.

9. The apparatus of claim 1 wherein the means for automatically terminating includes:
   termination control means including means for sensing current being supplied to the battery being charged; the control means providing a signal when the sensed current drops below a predetermined level; and
   timing means connected to the input means and responsive to the signal from the termination control means to become operation for removing AC electrical energy from the providing means a predetermined time after becoming operational.

10. The apparatus of claim 4 wherein the means for sensing battery temperature is a temperature variable linear resistor.

11. The apparatus of claim 4 wherein the means for sensing output voltage is a voltage divider connected across the output means.

12. A circuit for charging a storage battery, comprising:
    means for providing constant output voltage to the battery being charged;
    means for automatically varying the level of the constant output voltage as a function of temperature of the battery being charged; and
    means for automatically terminating the supply of constant output voltage to the battery a predetermined time after current being supplied to the battery drops below a predetermined level.

13. The circuit of claim 12 further including input means for connecting the providing means to a source of AC electrical energy and output means for connecting the providing means to the battery to be charged.

14. The circuit of claim 12 wherein the means for providing a constant output voltage includes a ferroresonant transformer and means for rectifying the output thereof.

15. The circuit of claim 12 wherein the means for automatically varying includes:
    means for sensing battery temperature;
    means for producing a temperature variable reference voltage as a function of the temperature sensed by the temperature sensing means; and
    means for sensing the output voltage being supplied by the providing means to the battery.

16. The circuit of claim 15 wherein:
    the means for providing a constant output voltage includes a ferroresonant transformer and means for rectifying the output thereof; and
    the means for automatically varying further includes a shunt regulator operatively associated with the ferroresonant transformer and means for controlling operation of the shunt regulator.

17. The circuit of claim 16 wherein the means for controlling includes means for comparing the temperature variable reference voltage with the output voltage being supplied to the battery, the means for controlling acting to control the shunt regulator for adjusting the level of the constant output voltage to be a predetermined multiple of the temperature variable reference voltage.

18. The circuit of claim 13 wherein the means for automatically terminating includes:
    termination control means including means for sensing current being supplied to the battery being charged, the termination control means further including a switch which becomes operational when current being sensed drops below a predetermined level; and
    timing means connected to the input means and responsive to actuation of the switch to become operational for removing AC electrical energy from the providing means a predetermined time after becoming operational.

19. A control circuit for a battery charger, the charger being of the type having a ferroresonant transformer and means for rectifying the output voltage thereof for producing a constant output voltage for charging the battery, the control circuit controlling the charger as a function of temperature of the battery being charged and as a function of acceptance current of the battery and comprising:
    means for automatically varying the level of the constant output voltage produced by the charger as a function of the temperature of the battery being charged; and
    means for automatically terminating operation of the charger a predetermined time after the acceptance current being supplied to the battery by the charger drops below a predetermined level.

20. The control circuit of claim 19 further comprising:
    means for manually adjusting the level of constant output voltage for a given battery temperature.

21. The control circuit of claim 19 wherein the means for automatically varying includes:
    a shunt regulator operatively associated with the ferroresonant transformer;
    means for sensing the rectified output voltage being supplied to the battery;
    means for sensing temperature of the battery being charged;
    means for producing a temperature variable reference voltage as a function of the temperature being sensed; and
    control means including a comparator for comparing the level of a portion of the output voltage being sensed with the temperature variable reference voltage, the control means acting to control the shunt regulator for adjusting the level of the charger output voltage to be a predetermined multiple of the temperature variable reference voltage.

22. The control circuit of claim 21 wherein:
    the ferroresonant transformer includes a center-tapped ferroresonant winding, the distal ends of which are interconnected through a capacitor;

the shunt regulator including an SCR bridge of the type having a pair of SCR's whose cathodes are interconnected and a pair of diodes whose anodes are interconnected, the two interconnections being connected together and to circuit common, the interconnections of the diode and SCR pairs being connected, respectively, to the center tap of the ferroresonant winding through current limiting means and to one of the distal ends of the ferroresonant winding.

23. The control circuit of claim 21 further including means for manually varying the level of the temperature variable reference voltage thereby to change the level of the constant output voltage for a given battery temperature.

24. The control circuit of claim 21 wherein:
the means for sensing output voltage is a voltage divider connected across the rectified output of the ferroresonant transformer; and
the means for sensing the temperature of the battery is a temperature variable linear resistor.

25. The control circuit of claim 19 wherein the means for automatically terminating includes:
timing means including means for removing operating electrical energy from the ferroresonant transformer a predetermined time after the timing means becomes operational;
a switch for turning on the timing means;
means for sensing acceptance current being supplied by the charger to the battery; and
means responsive to acceptance current sensed below a predetermined level to turn on the switch thereby to turn on the timing means.

26. The control circuit of claim 25 wherein:
the timing means is a timer actuated switching mechanism which becomes operational to open thereby to remove electrical energy from the ferroresonant transformer, the mechanism incorporating adjustment means for manually selecting a period of operation of the timer after which the switching mechanism opens.

* * * * *